(12) United States Patent
Nishikawa et al.

(10) Patent No.: US 10,408,330 B2
(45) Date of Patent: Sep. 10, 2019

(54) PROTECTIVE STRUCTURE FOR POWER TRANSMISSION APPARATUS

(71) Applicant: TOYOTA JIDOSHA KABUSHIKI KAISHA, Toyota-shi, Aichi-ken (JP)

(72) Inventors: Yukinobu Nishikawa, Anjyo (JP); Kazuki Iwakura, Toyota (JP); Hiroaki Kiyokami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/718,668

(22) Filed: Sep. 28, 2017

(65) Prior Publication Data
US 2018/0100576 A1    Apr. 12, 2018

(30) Foreign Application Priority Data
Oct. 11, 2016    (JP) .................. 2016-200203

(51) Int. Cl.
| *F16H 57/031* | (2012.01) |
| *B60K 5/12* | (2006.01) |
| *B60R 13/08* | (2006.01) |

(52) U.S. Cl.
CPC ............ *F16H 57/031* (2013.01); *B60K 5/12* (2013.01); *B60R 13/0861* (2013.01)

(58) Field of Classification Search
CPC .... B62D 25/20; B62D 25/2072; B62D 35/02; F16H 57/031; F16H 2057/02043; F16H 2057/02047; F16H 57/025; F16H 57/03; B60K 5/12; B60K 5/1208; B60K 5/1216; B60K 5/1275; B60K 5/1283; B60K 5/1291; B60K 17/00
See application file for complete search history.

(56) References Cited

U.S. PATENT DOCUMENTS

| 6,151,976 A * | 11/2000 | Inoue ............... B60K 17/28 475/206 |
| 7,281,596 B2 * | 10/2007 | Fukuda ........... F16H 57/0415 180/376 |
| 8,459,385 B2 * | 6/2013 | Katano ............ B60L 11/1892 180/65.22 |

(Continued)

FOREIGN PATENT DOCUMENTS

| JP | 2008-024047 A | 2/2008 |
| JP | 2012-162144 A | 8/2012 |
| JP | 2015-034593 A | 2/2015 |

*Primary Examiner* — Jeremy R Severson
(74) *Attorney, Agent, or Firm* — Oliff PLC

(57) ABSTRACT

Inside a casing, a gear chamber that accommodates a gear mechanism of a power transmission apparatus and also stores lubricating oil for lubricating the gear mechanism therein is partitioned across a first coupled part where case members are coupled to each other, and a road clearance of the first coupled part is set to be the lowest on a bottom surface of the casing and a cylinder block of an engine. A lower cover is provided with a projection upwardly projecting at a predetermined part thereof, the predetermined part being located apart from a position immediately below the first coupled part on the bottom surface, and a distance between the projection of the lower cover and the bottom surface is set to be smaller than a distance between the lower cover and the first coupled part.

4 Claims, 3 Drawing Sheets

(56) References Cited

U.S. PATENT DOCUMENTS

| | | | |
|---|---|---|---|
| 9,045,031 B2* | 6/2015 | Kouma | ................ B60K 5/1216 |
| 2008/0018136 A1 | 1/2008 | Yamazaki | |
| 2018/0208247 A1* | 7/2018 | Ikeda | ................... B62D 21/155 |

* cited by examiner

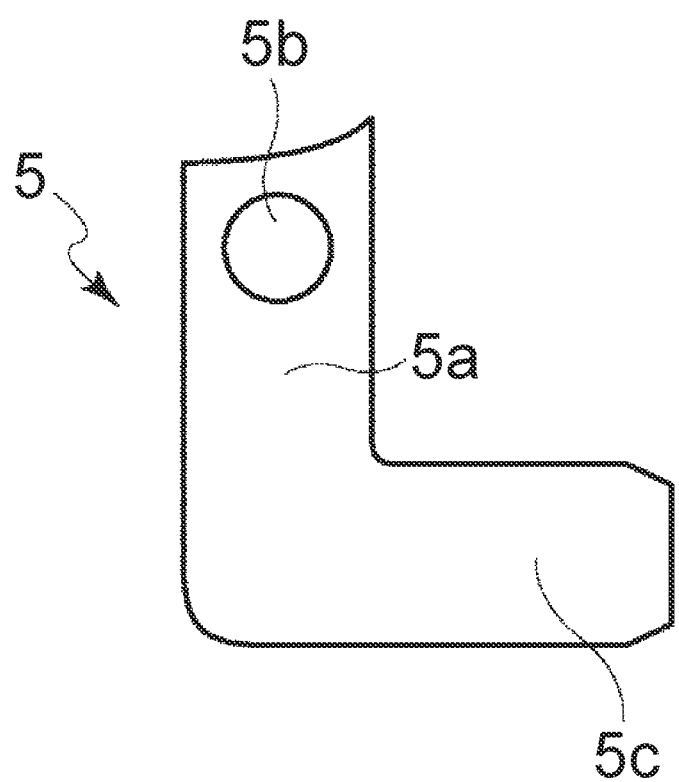

PROTECTIVE STRUCTURE FOR POWER TRANSMISSION APPARATUS

INCORPORATION BY REFERENCE

The disclosure of Japanese Patent Application No. 2016-200203 filed on Oct. 11, 2016 including the specification, drawings and abstract is incorporated herein by reference in its entirety.

BACKGROUND

1. Technical Field

The present disclosure relates to a protective structure for a power transmission apparatus, and particularly to a protective structure to prevent oil leakage of a power transmission apparatus resulting from an impact load inputted via a lower cover at the time of a road-surface interference of a vehicle.

2. Description of Related Art

For coping with both reduction of hood (bonnet) height for improvement of visibility of a vehicle and protection requirements for pedestrians, and also for satisfying needs for lowering the center of gravity for the purpose of improvement of movement performance of a vehicle, in recent automobiles or the like, vehicles in which power trains are installed at lower positions have been developed. In such vehicles, a minimum road clearance of a power train is set to be low; therefore, taking account of interference with a road surface, a lower cover disposed below the power train is required to have a strong structure against an impact load (destruction input) applied at the time of a road-surface interference of the vehicle.

As one example of related art to cope with the above requirement, for example, Japanese Patent Application Publication No. 2008-24047 discloses a lower cover formed by providing a flat plate-like member with recesses and projections that are alternately continued so as to provide the lower cover with a strong structure against a destruction input.

SUMMARY

Meanwhile, in order to realize the reduction of hood height and the lowering of center of gravity of a vehicle, it is preferable to install a transmission and a gear mechanism, such as a final drive gear, of a power transmission apparatus composing a part of a power train at lower positions of the vehicle.

Here, if a casing in which components of the power transmission apparatus are accommodated is a structural body composed of multiple case members that are a housing, a case, and others, these case members are coupled so as to define a space in which the components of the power transmission apparatus are accommodated. For example, the housing and the case are coupled to each other so as to define a gear chamber that is a space for accommodating the gear mechanism of the power transmission apparatus therein. In this case, if a coupled part of the case members that define the gear chamber located on a bottom surface of the casing is set to have a lowest road clearance, an impact load applied to the lower cover at the time of the road-surface interference of the vehicle is inputted into this coupled part via the lower cover.

However, lubricating oil used for lubricating the gear mechanism accommodated in the gear chamber is stored also in this gear chamber, and if an excessively great impact load is inputted into the gear chamber due to the road-surface interference, this coupled part might be damaged, so that the lubricating oil might leak out from the damaged part.

To cope with this, the present disclosure provides a protective structure for a power transmission apparatus capable of preventing oil leakage from the power transmission apparatus, resulting from an impact load at the time of a road-surface interference of a vehicle.

A protective structure for a power transmission apparatus according to the present disclosure is a protective structure for a power transmission apparatus that is installed in a vehicle, and transmits drive power outputted from an engine to axles, the protective structure including: a casing composed by coupling multiple case members, coupled to a cylinder block of the engine, and accommodating the power transmission apparatus therein; and a lower cover provided below the power transmission apparatus. Inside the casing, a gear chamber that accommodates a gear mechanism of the power transmission apparatus and also stores lubricating oil for lubricating the gear mechanism therein is partitioned across a first coupled part where the case members are coupled to each other, and a road clearance of the first coupled part is set to be the lowest on a bottom surface of the casing and the cylinder block. The lower cover is provided with a projection upwardly projecting at a predetermined part thereof, the predetermined part being located apart from a position immediately below the first coupled part on the bottom surface, and a distance between the projection of the lower cover and the bottom surface is set to be smaller than a distance between the lower cover and the first coupled part. The protective structure for the power transmission apparatus according to the present disclosure may also be defined as follows. A protective structure for a power transmission apparatus installed in a vehicle, the power transmission apparatus being configured to transmit drive power outputted from an engine to axles, the protective structure including: a casing configured by coupling a plurality of case members, the casing being coupled to a cylinder block of the engine, the casing storing a gear mechanism of the power transmission apparatus, the casing including a gear chamber configured to store lubricating oil used for lubricating the gear mechanism, the gear chamber being defined across a first coupled part where the case members are coupled to each other; and a lower cover disposed below the power transmission apparatus, the lower cover including a projection upwardly projecting from a predetermined part located apart from a position immediately below the first coupled part, and the protective structure being configured such that the first coupled part is positioned at the lowest on a bottom surface of the casing and the cylinder block, and a distance between the projection of the lower cover and the bottom surface facing the projection is smaller than a distance between the lower cover and the first coupled part.

In the protective structure for the power transmission apparatus according to the present disclosure, at the time of a road-surface interference of the vehicle, the projection provided to the lower cover is configured to abut to a predetermined part located apart from the first coupled part on the bottom surface of the casing and cylinder block. Hence, in the first coupled part where the case members are coupled to each other, the case members defining the gear chamber in which the gear mechanism of the power transmission apparatus is accommodated and the lubricating oil is stored, even if the road clearance of the first coupled part is set to be the lowest on the bottom surface of the casing and the cylinder block, the other parts than the projection of the lower cover are suppressed from abutting to the bottom surface of the casing and the cylinder block.

Accordingly, according to the protective structure for the power transmission apparatus of the present disclosure, it is possible to prevent oil leakage from the power transmission apparatus resulting from an impact load at the time of the road-surface interference of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a side view showing a shape of the protruding member.

DETAILED DESCRIPTION OF EMBODIMENTS

Hereinafter, an embodiment of the present disclosure will be described. The present embodiment is an example of the case of applying a protective structure for a power transmission apparatus of the present disclosure to a power train and a protective lower cover for the power train that are installed in an FF (front engine-front drive)-type hybrid vehicle.

Figure 1:
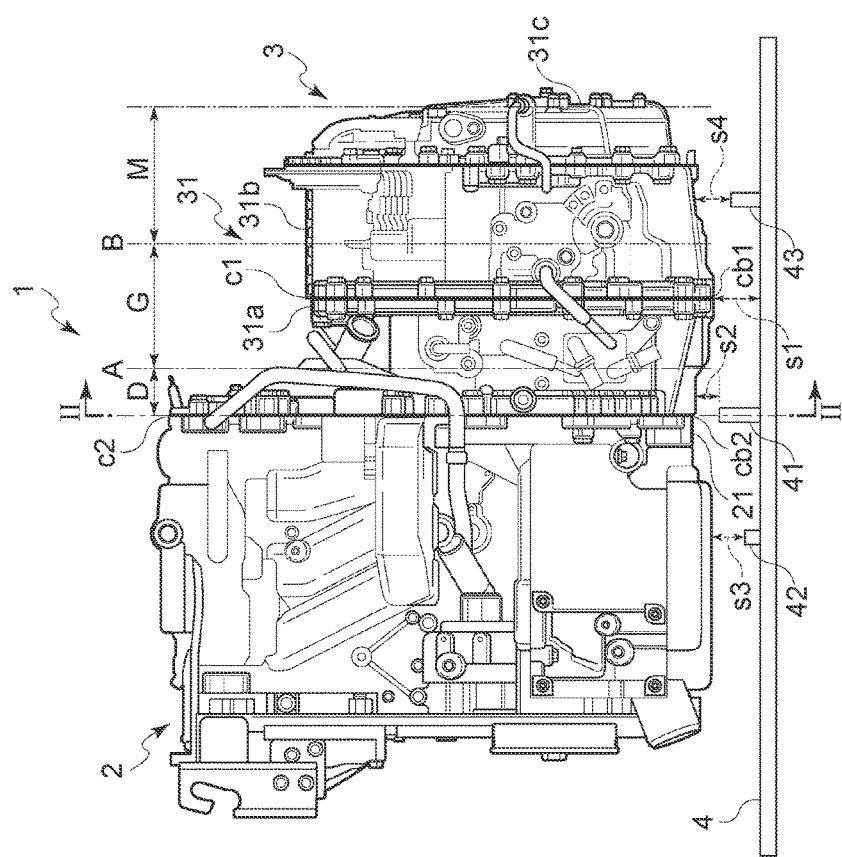
FIG. 1 is an outline view of a power train and a lower cover according to an embodiment of the present disclosure (as viewed from the front when being installed in a vehicle)

FIG. 1 is an outline view of the power train and the lower cover of the present embodiment, as viewed from the front when they are installed in the vehicle. It should be noted that when being installed, the lower cover is disposed together with the power train at a frontward position of the vehicle.

As shown in the same drawing, the power train 1 is composed of an engine 2 and a transaxle 3. The lower cover 4 is disposed below the transaxle 3. The engine 2 is an internal combustion engine, such as a gasoline engine and a diesel engine, provided as a power source. The transaxle 3 is coupled to the engine 2 so as to transmit a motive power outputted by the engine 2 to right and left front wheels (not illustrated in the drawing) as driven wheels of the vehicle through not-illustrated axles. This transaxle 3 has a casing 31 in which components of a power split mechanism, a transmission, a reduction unit, a gear mechanism such as a final drive gear including a differential mechanism, and others (all are not illustrated in the drawing) that compose the power transmission apparatus are accommodated. In the present embodiment, inside this casing 31, a rotary machine (not illustrated in the drawing) as a power source and/or an electric power generator of the hybrid vehicle is also accommodated.

Here, the structure of the casing 31 of the transaxle 3 will be described. The casing 31 is a structural body configured by coupling multiple case members. In the transaxle 3 of the present embodiment, the casing 31 includes three case members: a transaxle housing 31a (hereinafter, referred to as a housing 31a); a transaxle case 31b (hereinafter, referred to as a case 31b); and a rear cover 31c. The casing 31 is composed by coupling the case 31b to the housing 31a, and further coupling the rear cover 31c to this case 31b. It should be noted that the case members composing the casing 31 are not limited to these three members.

In the transaxle 3, the housing 31a, the case 31b, and the rear cover 31c that compose the casing 31 of the transaxle 3 are coupled to each other, to thereby define a space where a gear mechanism and others are accommodated, inside the casing 31. Specifically, the case 31b is coupled to the housing 31a so as to form a space between a partitioning wall A provided in the housing 31a and a partitioning wall B provided in the case 31b. Through this, a gear chamber G that is a space for accommodating the gear mechanism of the power transmission apparatus therein is defined inside the casing 31. The rear cover 31c is coupled to the case 31b so as to form a space between the partitioning wall B provided in the case 31b and an inner wall of the rear cover 31c. Through this, a motor chamber M that is a space for accommodating the rotary machine as a power source and/or an electric power generator of the hybrid vehicle therein is defined inside the casing 31. Of the case members composing the casing 31, the housing 31a (corresponding to a case member on the engine side of the present disclosure) is coupled to a cylinder block 21 of the engine 2 so as to form a space between the partitioning wall A provided in the housing 31a and a coupled part of the cylinder block 21. Through this, a damper chamber D is defined inside the casing 31. This damper chamber D is a space for accommodating respective devices (all are not illustrated in the drawing) such as a torque limiter to limit an input torque between the engine 2 and the transmission accommodated in the gear chamber G, and a damper (corresponding to a torque-variation reduction mechanism of the present disclosure) to suppress and absorb variation in torque of a motive power transmitted from the engine 2 to the transmission in the gear chamber G.

In the transaxle of the FF-type hybrid vehicle, the method of accommodating the devices such as the gear mechanism as a component composing the power transmission apparatus, the rotary machine as the power source and the like, and the damper, in the space, such as the gear chamber inside the casing 31 is well known as disclosed in Japanese Patent Application Publication No. 2012-162144 and Japanese Patent Application Publication No. 2015-34593, for example, and thus description thereof will be omitted.

Meanwhile, in the transaxle 3 of the present embodiment, inside the casing 31, the gear chamber G, where the gear mechanism of the power transmission apparatus is accommodated and the lubricating oil used for lubricating this gear mechanism is stored, is defined across a coupled part where the case members are coupled to each other. Specifically, the gear chamber G is defined across a coupled part cb1 (corresponding to a first coupled part of the present disclosure) of a coupled part c1 where the housing 31a and the case 31b are coupled to each other, the coupled part cb1 where the these case members are coupled to each other on a bottom surface of the casing 31. The road clearance of the coupled part cb1 (hereinafter, referred to as a contact surface cb1) between the housing 31a and the case 31b on the bottom surface of the casing 31 is set to be the lowest on the bottom surface (corresponding to a bottom surface of the present disclosure) of the casing 31 and the cylinder block 21. Hence, at the time of a road-surface interference of the vehicle, an impact load applied to the lower cover 4 might be inputted into the contact surface cb1 of the gear chamber G via the lower cover 4. In the bottom part of the gear chamber G, the lubricating oil used for lubricating the gear mechanism is stored, and thus damage might be caused to a part of the contact surface cb1 and the lubricating oil might leak out from this damaged part when an excessively great impact load is inputted due to the road-surface interference.

To cope with this, the power train and the lower cover of the present embodiment have a protective structure to prevent oil leakage from the power transmission apparatus resulting from an impact load at the time of the road-surface interference of the vehicle. Hereinafter, this protective structure will be described.

As shown in FIG. 1, the lower cover 4 is provided with ribs 41 to 43 upwardly projecting on a top surface of the lower cover 4. These ribs 41 to 43 also serves as a structure to secure rigidity of the lower cover 4, and the projections of these ribs are formed so as to extend in a longitudinal direction (a vehicle-longitudinal direction) on the top surface of the lower cover 4. On the top surface of the lower cover 4, the rib 41 (corresponding to a projection of the present disclosure) of these ribs is disposed at a predetermined part (position) apart from a position immediately below the above contact surface cb1 on the bottom surface of the casing 31 and the cylinder block 21. Specifically, the rib 41 is provided on the top surface of the lower cover 4 such that the rib 41 is located immediately below a coupled part cb2 (corresponding to a second coupled part of the present disclosure) of a coupled part c2 where the housing 31a and the cylinder block 21 are coupled to each other, the coupled part cb2 where the casing 31 and the cylinder block 21 are coupled to each other on the bottom surface thereof.

Meanwhile, as for the damper chamber D of the casing 31, as described above, the damper chamber D is a space where the devices such as the torque limiter and the damper are accommodated, and no lubricating oil is stored in this chamber. For this reason, even if an excessively great impact load is inputted due to the road-surface interference via the lower cover 4 into a part of the casing 31 where the damper chamber D is defined, no lubricating oil leaks out from this defined part. That is, the coupled part cb2 is corresponding to the part where the damper chamber D is defined, and the rib 41 is disposed at a position immediately below the coupled part cb2 that is the predetermined part (position) apart from the position immediately below the contact surface cb1 on the top surface of the lower cover 4. In this manner, the rib 41 is avoided from being disposed at a position immediately below the contact surface cb1 from which the lubricating oil might leak out, but is disposed at a position on the top surface of the lower cover 4, which is located immediately below the coupled part cb2 from which no lubricating oil leaks out.

In the lower cover 4, a distance s2 between a top end of the rib 41 provided on the top surface of the lower cover 4 and the coupled part cb2 of the damper chamber D on the bottom surface of the casing 31 and the cylinder block 21 is set to be smaller than a distance s1 between the top surface of the lower cover 4 and the contact surface cb1 of the gear chamber G. In addition to this, the respective distances s2 to s4 between the bottom surface and the respective top ends of the ribs 41 to 43 are defined such that the distance s2 between the bottom surface and the top end of the rib 41 disposed immediately below the coupled part cb2 becomes the smallest among those of the ribs 41 to 43. By these settings, at the time of the road-surface interference of the vehicle, when the top surface of the lower cover 4 abuts to the bottom surface of the casing 31 and the cylinder block 21, the top end of the rib 41 abuts to the coupled part cb2 of the damper chamber D on the bottom surface before the other parts than the rib 41 of the lower cover 4 abuts to the contact surface cb1 of the gear chamber G on the bottom surface. Hence, even if the road clearance is set to be the lowest at the contact surface cb1 that is a part where the housing 31a and the case 31b are coupled to each other on the bottom surface of the casing 31 and the cylinder block 21, the housing 31a and the case 31b that define the gear chamber G where the gear mechanism is accommodated and the lubricating oil used for lubricating this mechanism is stored, the other parts than the rib 41 on the top surface of the lower cover 4 is suppressed from abutting to the bottom surface of the casing 31 and the cylinder block 21.

According to the power train and the lower cover of the present embodiment, with the above described protective structure, it is possible to prevent oil leakage from the power transmission apparatus resulting from an impact load at the time of the road-surface interference of the vehicle.

In the above description, the rib 41 of the ribs provided to the lower cover 4 for securing the rigidity thereof is disposed at the position immediately below the coupled part cb2 of the damper chamber D free from the oil leakage, to thereby prevent the oil leakage from the power transmission apparatus at the time of the road-surface interference of the vehicle. However, the present disclosure is not limited to this, and it may be configured that a projection different from the rib 41 is provided on the top surface of the lower cover 4, and this projection is disposed immediately below the coupled part cb2 of the damper chamber D. Also in this case, as with the above case, the distance between the top end of the projection and the coupled part cb2 on the bottom surface of the casing 31 and the cylinder block 21 is set to be smaller than the distance s1 between the top surface of the lower cover 4 and the contact surface cb1 of the gear chamber G on the bottom surface.

In the above description, it is configured that at the time of the road-surface interference of the vehicle, an impact load is inputted into the coupled part cb2 of the damper chamber D via the rib 41 of the lower cover 4. However, the part into which the impact load is inputted is not limited to the coupled part cb2 of the damper chamber D. Specifically, this part may be any part of the bottom surface of the casing 31 and cylinder block 21 as far this part is free from the oil leakage even when the impact load is inputted thereinto.

In the case of providing a different projection from the rib on the top surface of the lower cover 4, it can be considered to provide multiple projections thereon. In this case, it is configured that at least one of these projections abuts to the part free from the oil leakage even when an impact load is inputted into the bottom surface of the casing 31 and the cylinder block 21. For this reason, a distance between the part free from the oil leakage and the top end of this projection is set to be smaller than the distance s1 between the contact surface cb1 of the gear chamber G and the top surface of the lower cover 4. Respective distances between the bottom surface of the casing 31 and the cylinder block 21, and the respective top ends of the multiple projections are set such that the distance between the part free from the oil leakage and the top end of the projection that abuts to this part free from the oil leakage is set to be the smallest among those of the multiple projections.

Variation of Embodiment

By the way, the damper chamber D is defined by coupling the housing 31a of the casing 31 to the cylinder block 21 of the engine 2, as aforementioned. This coupling is carried out by inserting a bolt into a fastening hole for coupling provided to a flange on an outer circumference of an opening at an end located on the engine side of the housing 31a from an opposite side to the engine 2, and by screwing a male screw portion of this bolt into a female screw portion provided to a joint part of the cylinder block 21. Here, utilizing this coupling structure, a projecting member is provided to the coupled part cb2 of the damper chamber D so as to securely bring (the top end of) the rib 41 provided on the top surface of the lower cover 4 to abut to the coupled part cb2 of the damper chamber D on the bottom surface of the casing 31 and the cylinder block 21 at the time of the road-surface interference of the vehicle.

Hereinafter, an example of the power train and the lower cover provided with this projecting member will be described as a variation of the above embodiment. Hereinafter, it should be noted that description of respects obvious to those skilled in the art with reference to the above described explanation of the embodiment will be omitted or simplified, and characteristic configurations and functions of this variation will be explained. In the following description, components having the same functions as those of the components having been already described in the above embodiment are denoted by the same reference numerals as those of the components, and overlapped description thereof will be omitted. However, correction and modification as explained in the above embodiment are also applied to this variation as far as they are not contrary to the present disclosure.

Figure 2:
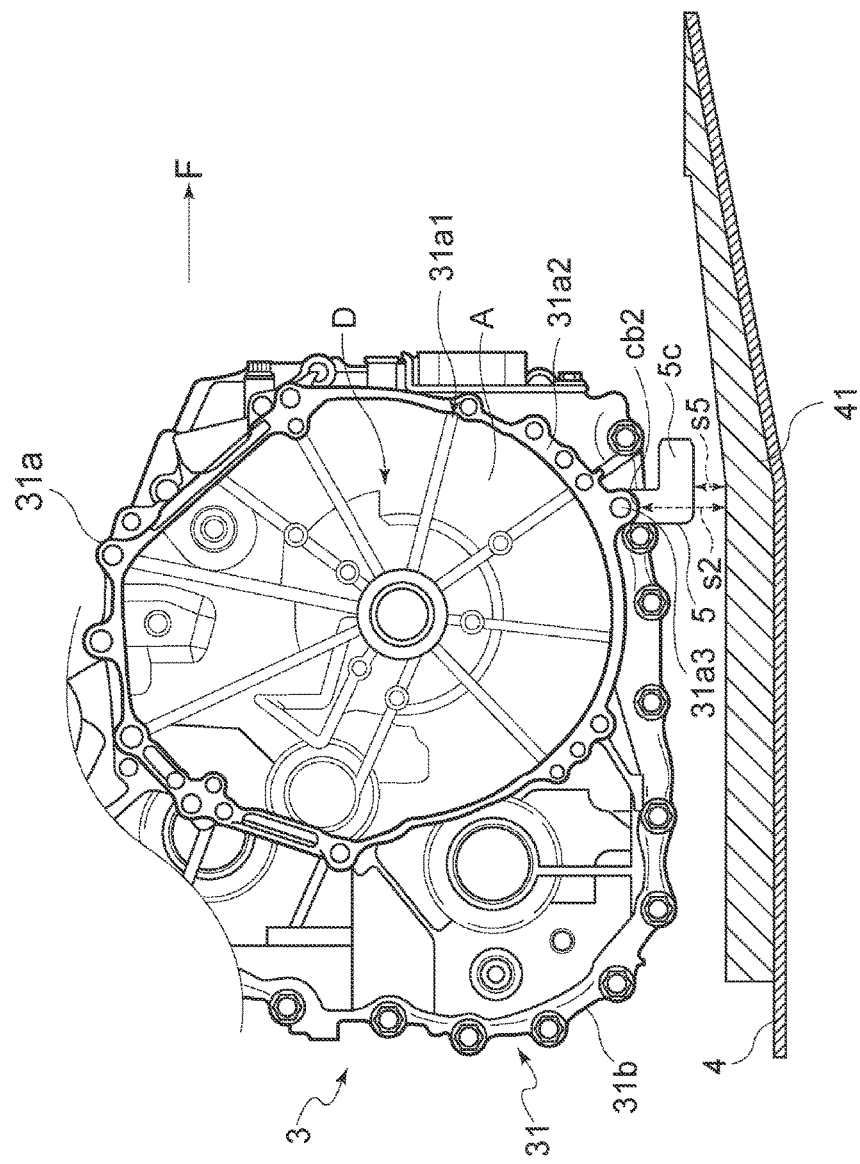
FIG. 2 is a cross sectional view of a power train and a lower cover of a variation provided with a protruding member, taken along line II-II of FIG. 1 (as viewed from an engine side)

FIG. 2 is a cross sectional view of the power train and the lower cover of the variation provided with the projecting member, taken along line II-II of FIG. 1, and shows a cross section of these transaxle and lower cover as viewed from the engine side. FIG. 2 shows the casing 31 of the transaxle 3, and particularly shows a state of an opening 31a1 at an end located on the engine side of the housing 31a. It should be noted that a direction indicated by an arrow "F" in the drawing corresponds to a vehicle frontward direction when the power train is installed.

As shown in FIG. 2, in the power train and the lower cover of this variation, in the opening 31a1 at the end located on the engine side of the housing 31a, by utilizing a fastening hole 31a3 among multiple fastening holes provided to a flange 31a2 on the outer circumference of this opening, the fastening hole 31a3 belonging to the coupled part cb2 of the damper chamber D, there is provided a projecting member 5.

FIG. 3 is a side view showing a shape of this projecting member 5. The projecting member 5 has an L-like shape having a standing piece 5a and a bottom piece 5c, and a fixed portion of the standing piece 5a is formed with a through-hole 5b through which a bolt is inserted.

When the housing 31a is coupled to the cylinder block 21, a bolt (not illustrated in the drawing) is inserted through the through-hole 5b of the projecting member 5, and in this state, and a front end portion of the bolt is further inserted into the fastening hole 31a3 for coupling that is provided to the flange 31a2 of the housing 31a. Subsequently, a male screw portion of this bolt is screwed into a female screw portion (not illustrated in the drawing) of a joint surface of the cylinder block 21 so as to finally couple the housing 31a to the cylinder block 21 through bolt fastening. With this coupling, the projecting member 5 is fixed to the coupled part cb2 of the damper chamber D while the fixed portion of the standing piece 5a is held between a head of the bolt and the flange 31a2. In this fixed state, the projecting member 5 is in a state in which a lower end of the bottom piece 5c of the projecting member 5 projects toward the rib 41 provided on the top surface of the lower cover 4. In this case, a distance s5 between the lower end of the bottom piece 5c of the projecting member 5 that is fixed to the coupled part cb2 of the damper chamber D and the top end of the rib 41 on the lower cover 4 that is disposed immediately below this lower end of the bottom piece 5c is smaller than the distance s2 between the coupled part cb2 of the damper chamber D and the top end of the rib 41 on the lower cover 4 when the projecting member 5 is not provided.

As shown in FIG. 3, the projecting member 5 is formed with an arc-shaped cutout at an upper portion of the standing piece 5a. This cutout is formed into an arc shape corresponding to a shape of an outer circumference of the housing 31a at a base part (rising part) of the flange 31a2 to which the standing piece 5a is fixed. With this arc-shaped cutout, in a state of being fixed to the coupled part cb2 of the damper chamber D, the projecting member 5 is prevented from being pivoted around the bolt for fastening that is inserted through the through-hole 5b of the standing piece 5a.

Accordingly, by providing the coupled part cb2 of the damper chamber D with the projecting member 5 in this manner, it is possible to securely input an impact load having been inputted via the rib 41 of the lower cover 4 at the time of the road-surface interference of the vehicle into the coupled part cb2 of the damper chamber D free from the oil leakage via the projecting member 5.

The shape of the projecting member 5 is not limited to the L-like shape of the present variation. The projecting member may have any shape as far as the shape thereof is a shape projecting toward the lower cover 4 or projecting toward the rib 41 on the top surface of the lower cover 4 in a state of being fixed to the coupled part cb2 of the damper chamber D.

In the above description, it has been described that the power train and the lower cover of the embodiment (including the variation thereof) are installed in the FF-type hybrid vehicle, but the protective structure of the present disclosure may be applied to vehicles other than the hybrid vehicle as far as each of the vehicles includes a casing of a power transmission apparatus composed by coupling multiple case members to each other.

What is claimed is:
1. A protective structure for a power transmission apparatus installed in a vehicle, the power transmission apparatus being configured to transmit drive power outputted from an engine to axles,
the protective structure comprising:
a casing configured by coupling a plurality of case members, the casing being coupled to a cylinder block of the engine, the casing storing a gear mechanism of the power transmission apparatus, the casing including a gear chamber configured to store lubricating oil used for lubricating the gear mechanism, the gear chamber being defined across a first coupled part where the case members are coupled to each other; and
a lower cover disposed below the power transmission apparatus, the lower cover including a projection upwardly projecting from a predetermined part located apart from a position immediately below the first coupled part, and
the protective structure being configured such that
the first coupled part is located at the lowest position on a bottom surface of the casing and a bottom surface of the cylinder block, and
a size of a gap between the projection of the lower cover and the bottom surface facing the projection is smaller than a size of a gap between the lower cover and a portion of the first coupled part, which has a lowest road clearance.

2. The protective structure according to claim 1, wherein
among the case members comprising the casing in which the gear chamber is defined, the case member located on an engine side and coupled to the cylinder block is provided therein with a partitioning wall such that the partitioning wall partitions the gear chamber from a damper chamber in which a torque variation reduction mechanism to reduce variation in torque of the drive power outputted from the engine is stored, and the predetermined part of the lower cover to which the projection is provided is located immediately below a second coupled part where the cylinder block and the case member located on the engine side are coupled to each other on the bottom surface.

3. The protective structure according to claim 2, wherein the second coupled part includes a projecting member projecting toward the lower cover.

4. The protective structure according to claim 3, wherein the projecting member projects toward the projection of the lower cover.

* * * * *